(12) United States Patent
Rajagopalan et al.

(10) Patent No.: US 8,280,376 B2
(45) Date of Patent: Oct. 2, 2012

(54) GEOGRAPHY AWARE PEER-TO-PEER OVERLAY CREATION

(75) Inventors: Sundaram M. Rajagopalan, Medford, MA (US); Deepak Das, Arlington, MA (US); Balaji Raghothaman, Hollis, NH (US); Woojune Kim, Arlington, MA (US); Steve Kohalmi, Newton, MA (US)

(73) Assignee: Airvana, Corp., Chelmsford, MA (US)

( * ) Notice: Subject to any disclaimer, the term of this patent is extended or adjusted under 35 U.S.C. 154(b) by 451 days.

(21) Appl. No.: 12/347,511

(22) Filed: Dec. 31, 2008

(65) Prior Publication Data

US 2010/0167742 A1    Jul. 1, 2010

(51) Int. Cl.
 *H04W 36/00* (2009.01)
(52) U.S. Cl. ......... 455/436; 455/555; 455/444; 370/331
(58) Field of Classification Search .......... 455/436–439, 455/411, 414.1, 462, 554.1, 555, 444; 370/331–332, 370/338
See application file for complete search history.

(56) References Cited

U.S. PATENT DOCUMENTS

| | | | |
|---|---|---|---|
| 6,418,139 B1 * | 7/2002 | Akhtar | ........................... 370/356 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif et al. | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |

(Continued)

OTHER PUBLICATIONS

3rd Generation Partnership Project "3GPP2", "cdma2000 High Rate Packet Data Air Interface Specification", C.S0024, version 4.0, Oct. 25, 2002 (548 pages).

(Continued)

*Primary Examiner* — Cong Tran
(74) *Attorney, Agent, or Firm* — Fish & Richardson P.C.

(57) ABSTRACT

In general, a first private access point detects a neighboring private access point. An address of the neighboring private access point is identified, and a peer-to-peer network that includes the first private access point and the neighboring private access points is formed. The peer-to-peer network is maintained between the first private access point and the neighboring private access points.

20 Claims, 11 Drawing Sheets

U.S. PATENT DOCUMENTS

| | | | |
|---|---|---|---|
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1* | 3/2008 | Mate et al. | 370/331 |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2009/0028167 A1* | 1/2009 | Takeda et al. | 370/401 |
| 2009/0163202 A1* | 6/2009 | Humblet et al. | 455/432.1 |
| 2009/0187983 A1* | 7/2009 | Zerfos et al. | 726/10 |
| 2009/0271864 A1* | 10/2009 | Dietrich et al. | 726/23 |
| 2010/0167742 A1 | 7/2010 | Rajagopalan et al. | |

OTHER PUBLICATIONS $3^{rd}$ Generation Partnership Project "3GPP2", "cdma2000 High Rate Packet Data Air Interface Specification", C.S0024-A, version 1.0, Mar. 2004 (1083 pages).

$3^{rd}$ Generation Partnership Project "3GPP2", "cdma2000 High Rate Data Air Interface Specification", C.S0024-A, version 2.0, Jul. 2005 (1227 pages).

$3^{rd}$ Generation Partnership Project "3GPP2", "cdma2000 High Rate Data Air Interface Specification", C.S0024-B, version 1.0, Apr. 2006 (1623 pages).

$3^{rd}$ Generation Partnership Project "3GPP2", "cdma2000 High Rate Data Air Interface Specification", C.S0024-B, version 2.0, Mar. 2007 (1627 pages).

* cited by examiner

Detecting, by the first private access point, the address of the neighboring private access point on a secure channel.

710e

Detecting, by the first private access point, the address of the neighboring private access point on a secure channel, the address being contained within an encrypted message.

710f

Detecting, by the first private access point on an insecure channel, both the address of the neighboring private access point and a set of addresses known by the neighboring private access point, the set of addresses being associated with peers of the neighboring private access point.

710g

Detecting, by the first private access point, both the address of the neighboring private access point and a set of addresses known by the neighboring private access point, the set of addresses being associated with peers of the neighboring private access point, wherein both the address of the neighboring private access point and the set of addresses are detected on a secure channel.

Detecting, by the first private access point, both the address of the neighboring private access point and a set of addresses known by the neighboring private access point, the set of addresses being associated with peers of the neighboring private access point, wherein both the address of the neighboring private access point and the set of addresses are detected on a secure channel, and wherein an encrypted message contains both the address of the neighboring private access point and the set of addresses.

GEOGRAPHY AWARE PEER-TO-PEER OVERLAY CREATION

TECHNICAL FIELD

This patent application relates generally to geography aware peer-to-peer overlay creation.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs"). Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In general, in some aspects, a first private access point detects a neighboring private access point. An address of the neighboring private access point is identified, and a peer-to-peer network that includes the first private access point and the neighboring private access points is formed. The peer-to-peer network is maintained between the first private access point and the neighboring private access points.

Aspects may include one or more of the following features. Identifying the address includes detecting, by the first private access point, an identifying key of the neighboring private access point on an insecure channel and querying, by the first access point, a service manager to identify the address associated with the identifying key. Identifying the address includes detecting, by the first private access point, an identifying key of the neighboring private access point on a secure channel; and querying, by the first access point, a service manager to identify the address associated with the identifying key. Identifying the address includes detecting, by the first private access point, an identifying key of the neighboring private access point on a secure channel, the identifying key being contained within an encrypted message. The first access point queries a service manager to identify the address associated with the identifying key. Identifying the address includes detecting, by the first private access point, the address of the neighboring private access point on an insecure channel. Identifying the address includes detecting, by the first private access point, the address of the neighboring private access point on a secure channel. Identifying the address includes detecting, by the first private access point, the address of the neighboring private access point on a secure channel, the address being contained within an encrypted message. Identifying the address includes detecting, by the first private access point on an insecure channel, both the address of the neighboring private access point and a set of addresses known by the neighboring private access point, the set of addresses being associated with peers of the neighboring private access point. Identifying the address includes detecting, by the first private access point, both the address of the neighboring private access point and a set of addresses known by the neighboring private access point, the set of addresses being associated with peers of the neighboring private access point. Both the address of the neighboring private access point and the set of addresses are detected on a secure channel. Identifying the address includes detecting, by the first private access point, both the address of the neighboring private access point and a set of addresses known by the neighboring private access point, the set of addresses being associated with peers of the neighboring private access point. Both the address of the neighboring private access point and the set of addresses are detected on a secure channel, and an encrypted message contains both the address of the neighboring private access point. Forming the peer-to-peer network includes creating communication tunnels between the first private access point and the neighboring private access point. Maintaining the peer-to-peer network is maintained by exchanging information between pairs of peer private access points. The neighboring private access point includes two or more private access points.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

FIGS. 7a-7c are flow diagrams of examples for the determination of peer addresses.

Like reference symbols in the various drawings indicate like elements.

DETAILED DESCRIPTION OF ILLUSTRATIVE EMBODIMENTS

Figure 1:
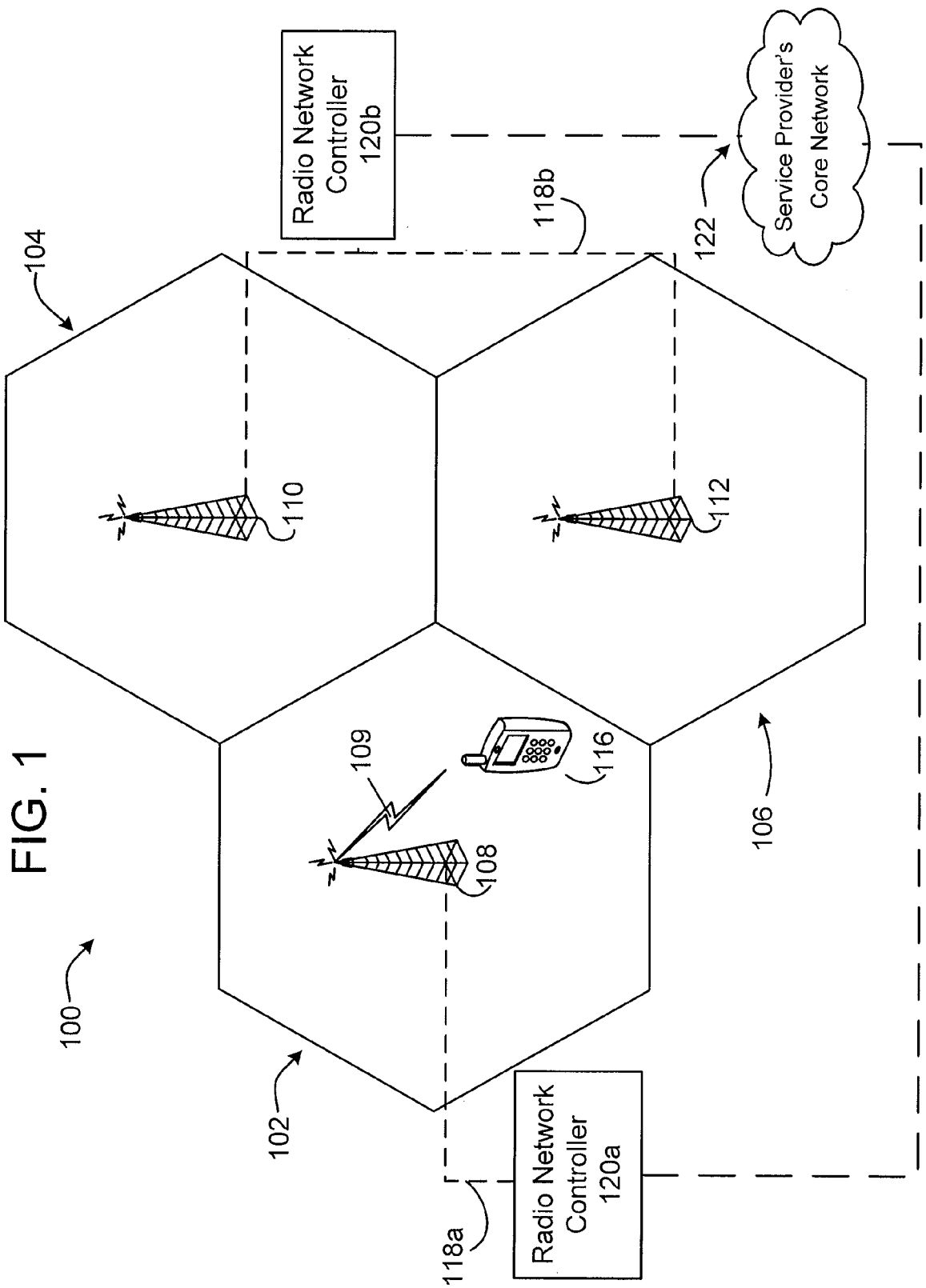
FIG. 1 is a diagram of a radio access network (RAN).

In wireless communication networks generally, the geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas." An access point that serves a femtocell area is referred to as a "femtocell access point." A macrocell, for example, may provide coverage to an area of a few blocks, while a femtocell access point may provide coverage to an area spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of access terminals at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a home, an office, a public space, or a restaurant. For ease of description, private access points will be described hereinafter as femtocell access points or FAPs.

For communications between access terminals and access points generally, a call established between an access point and an access terminal may be transferred to another access point in a process referred to as a "handoff". From the point of view of a particular access point, there are 2 types of handoffs: a "hand-out" moves an in-progress call out to a neighboring access point (allowing the access point to free up its resources) and a "hand-in" occurs when a neighboring access point transfers an in-progress call into the access point (the access point needs to allocate resources to service the call). A handoff may be performed for a variety of different reasons. Typically, a handoff occurs when an access terminal moves into a different coverage area. For example, a call that has been established with a macrocell may be transferred to a neighboring macrocell when the access terminal moves outside of the service area covered by the macrocell. A handoff may also occur when the capacity for connecting new calls to a particular macrocell is reached. In this scenario, the macrocell may transfer an existing call (or a new call) to another macrocell with overlapping coverage.

Hand-offs between macrocells and femtocells may occur for similar/other reasons. A femtocell hand-in may occur when an access terminal determines that a neighboring femtocell can provide faster and/or more robust communications with the access terminal than can the macrocell. For example, the access terminal could be located in closer geographic proximity to the femtocell or there may be fewer obstructions in the communication path between the femtocell and the access terminal.

Femtocell hand-in may occur whenever a femtocell signal is detected by the access terminal because it is operator policy to prefer femtocell usage over macrocell. To facilitate a handoff, an access terminal identifies nearby macrocells or femtocells from information provided by the access point which is currently servicing the call. The information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many hand-off processes, for example, an access terminal selects a scrambling code of a nearby access point from the neighbor list received from its current access point. The access terminal uses the scrambling code to decode a pilot signal that is continuously transmitted by the nearby access point in order to determine the quality of the communication channel between itself and that access point. For example, the access terminal can determine the signal-to-noise ratio, and the bandwidth of the communication channel. If the access terminal determines that the communication channel is of sufficient quality, it establishes communication with the nearby access point. Otherwise, the access terminal selects the scrambling code of a different access point from the neighbor list, tests the associated pilot signal, and repeats the process until a suitable access point is determined.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with an access terminal over an airlink. For example, macrocell 108 communicates with access terminal (AT) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the CDMA 1x EV-DO standards, the same concepts are applicable to other wireless communication standards, including 3GPP's UMTS, CDMA2000, WiMax, WiBro, WiFi, and the like.

The following sections of the 3GPP Standard are hereby incorporated by reference in their entirety:

3GPP Technical Specification 25.331 version 8.3.0 Release 8, 2008-07, Universal Mobile Telecommunications System (UMTS); Radio Resource Control (RRC); Protocol specification; 3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
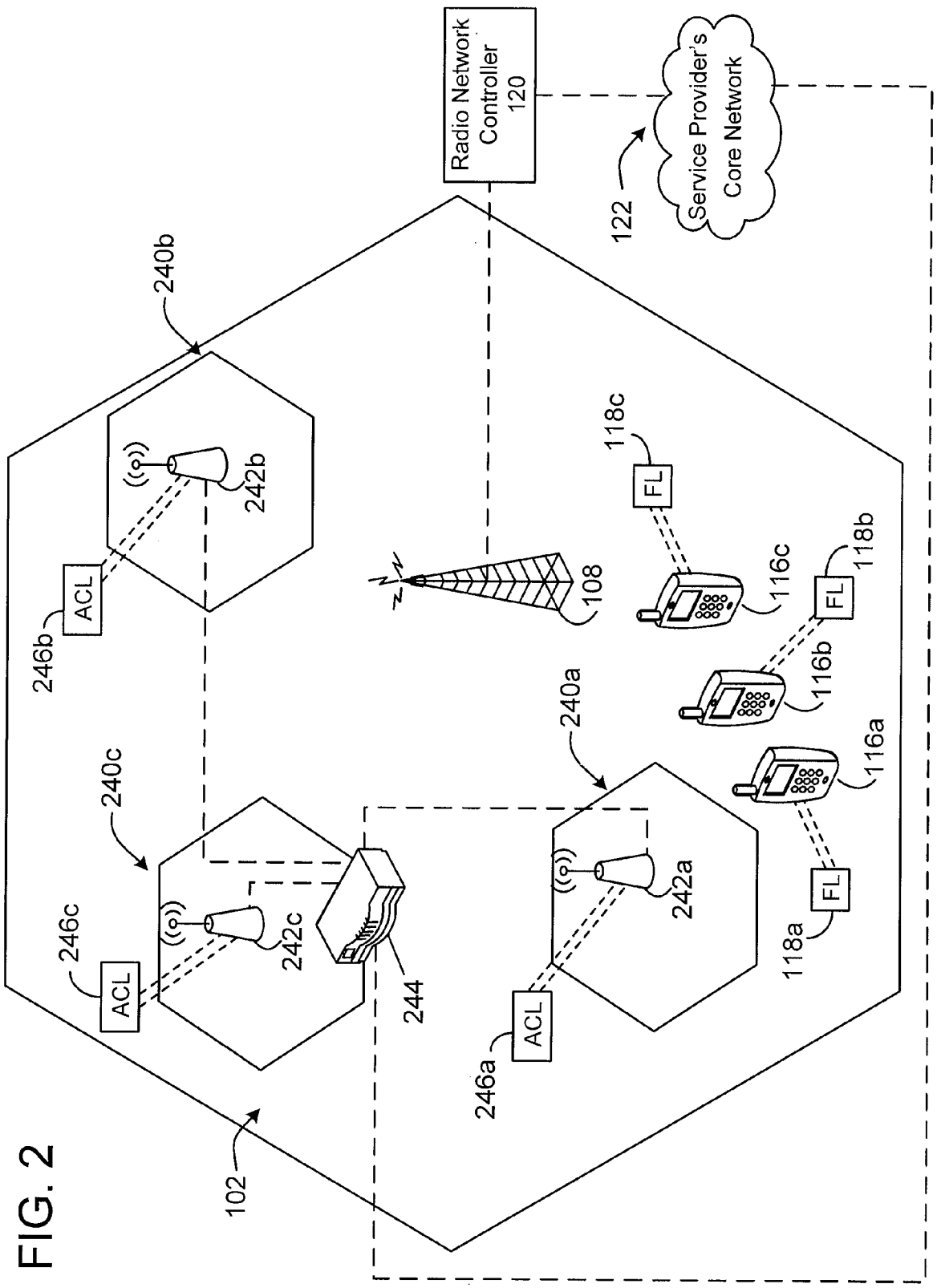
FIG. 2 is a diagram of a femtocell deployment within a macrocell area of the RAN of FIG. 1.

Referring to FIG. 2, it is diagram showing a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 is in communication with one or more of the FAPs 242a-c. The femtocell server 244 maintains active associations between access terminals such as access terminals (ATs) 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may in some cases be a shorthand for a reference to the femtocell server 244, and in some implementations, certain functions of the core network 122 may be included in the femtocell server 244 and vice versa. For example, when reference is made to a FAP accessing stored information from the core network 122, all or part of the information might be stored on the core network 122 and/or the femtocell server 244.

Each of the FAPs 242a-c is generally configured to continuously transmit or broadcast a main pilot signal. The main pilot for a FAP is decoded with a main scrambling code assigned to that particular FAP. The terms "main scrambling code" and "main pilot" may also be referred to as "operating scrambling code" and "operating pilot," respectively. The FAPs' main scrambling codes may be assigned with maximum geographic dispersal in order to minimize radio interference probability (given that they may be reused within a macrocell area in a dense deployment). The main scrambling codes assigned to the FAPs 242a-c may be stored in the neighbor list of the macrocell 108.

From the perspective of an AT, a FAP is either an authorized FAP (e.g., a "home" FAP that the AT is authorized on), or an unauthorized FAP (e.g., a "foreign" FAP that the AT is not authorized on). A "home" FAP need not be located in a user's home and may, e.g., be located in an office building, or a public place. Likewise, a "foreign" FAP may be located, e.g., in close physical proximity to a user's "home" FAP but still be "foreign" from the perspective of the AT. Just as a FAP may identify more than one authorized AT in its access control list, an AT may be authorized on more than one FAP (and thus may have more than one authorized FAP or "home" FAP). Hereafter, for ease of description, a home FAP for an access terminal will be referred to as though it is the only home FAP for the access terminal. Access control lists may be updated periodically by, e.g., an administrator or operator of the core network, e.g., the core network 122.

Figure 3:
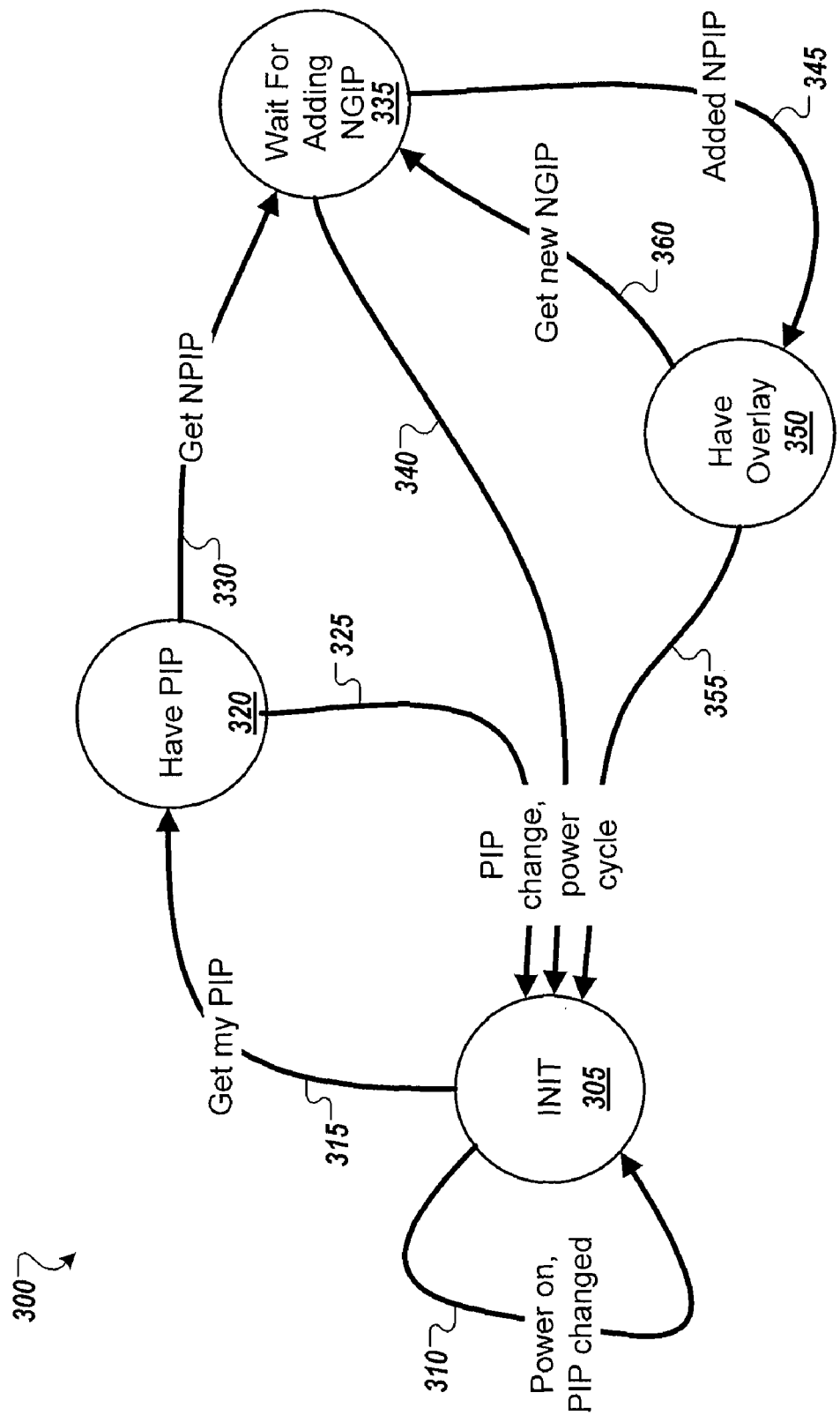
FIG. 3 is a diagram of an example femto access point peer to peer overlay state machine.

FIG. 3 is a diagram of an example FAP peer to peer (P2P) overlay state machine 300. In general, a FAP (e.g., the FAPs 242a, 242b, and 242c) can attempt to identify its own address for use in P2P operations. While some of the following examples refer to the public internet protocol (PIP) of an FAP, a number of different address types could be used instead, such as a global public address or a private address. The FAP may have its own PIP that uniquely identifies the FAP on a network such as the Internet. A firewall, gateway, router, or other type of network address translation (NAT) device may grant the FAP a private IP address that may not be globally unique. In these cases, the FAP can attempt to determine the address of the NAT, and use that address in P2P operations.

In some examples, the state machine 300 can start at an "initial" state 305. The state machine 300 can go through a transition 310 at power on and/or when the FAP's address is changed. If the FAP does not know its address, the state machine 300 can go through a transition 315 to determine a address for the FAP. In some examples, the FAP can request the address directly from the NAT. In some other examples, the FAP can determine the address of its NAT by requesting the address from a server that resides outside of the local network, such as a femto network gateway (FNG). When the FNG receives the request, the FNG can determine the FAP's address by identifying the source IP address of the request which can be the address of the FAP's NAT. Once the address has been determined, the state machine 300 transitions to a "have a address" state 320.

The "have a PIP" state 320 can go through two transitions, a transition 325 and a transition 330. The transition 325 happens when the PIP is lost, changes, or otherwise needs to be re-acquired, such as due to a power cycle of the FAP. The transition 325 causes the state machine 300 to return to the "initial" state 305. The transition 330 happens when a process of acquiring a neighbor public internet protocal address (NPIP) is initiated. In some examples, the NPIP can be the IP address of another neighbor FAP. In some examples, the transition 330 can be triggered automatically, such as part of a startup process when the FAP is initialized, or when triggered on a timed interval such as once every minute, every 15 minutes, once an hour, once per day, once per week, or on any other interval in which the FAP can look for neighboring FAPs. The transition 330 puts the state machine 300 in a "wait for adding NPIP" state 335.

The "wait for adding NPIP" state 335 can go through two transitions, a transition 340 and a transition 345. The transition 340, like the transition 325, happens when the PIP is lost, changes, or otherwise needs to be re-acquired, such as due to a power cycle of the FAP, and returns the state machine 300 to the "initial" state 305. The transition 345 occurs when a new NPIP is added to a collection of NPIPs. In some examples, the collection of NPIPs can represent a collection of neighbor FAPs that can be assembled to form a P2P overlay. Once the NPIP is added, the state machine 300 is placed into a "have overlay" state 350.

The "have overlay" state can go through two transitions, a transition 355 and a transition 360. The transition 355, like the transitions 325 and 340, happens when the PIP is lost, changes, or otherwise needs to be re-acquired, such as due to a power cycle of the FAP, and returns the state machine to the "initial" state 305. The transition 360, like the state 330, happens when a process of acquiring a new or additional NPIP is initiated. The transition 360 places the state machine 300 back into the "wait for adding NPIP" state 335.

Figure 4:
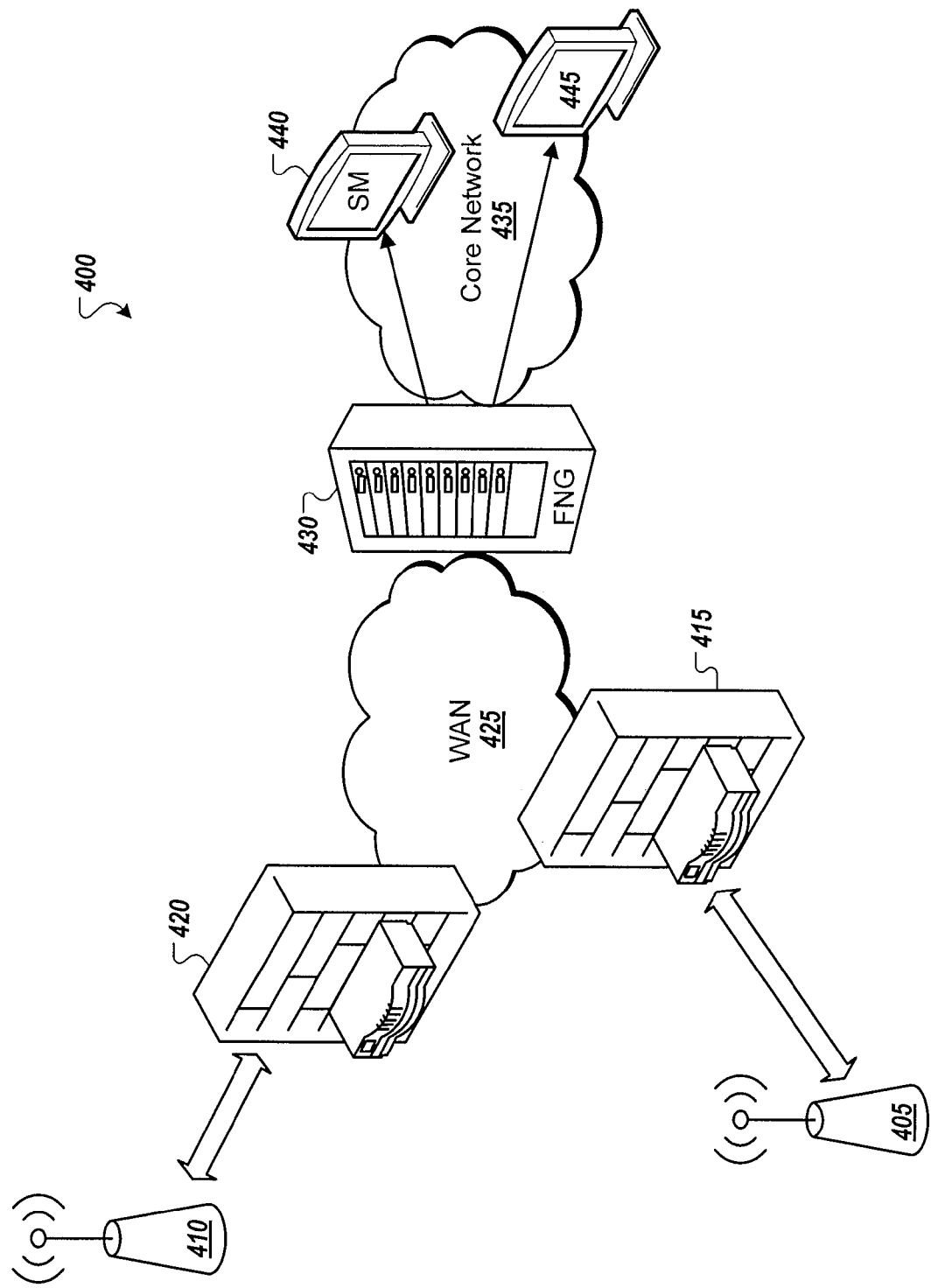
FIG. 4 is a diagram of an example system of femto access points.

FIG. 4 is a diagram of an example system 400 of FAPs. The system includes a FAP 405 and a FAP 410. The FAP 405 is communicatively connected (e.g., by wired or wireless Ethernet or other network connection) to a network address port translation (NAPT) device 415, such as a gateway device or broadband router. The FAP 405 is identified by a local network address, for example "172.16.12.90", that identifies the FAP 405 on its local network, but may not uniquely identify the FAP 405 on a wide are network such as the Internet. Likewise, the FAP 410 is communicatively connected to a NAPT device 420 and is identified by a local network address such as "192.168.1.102". In some examples, the NAPT devices 415, 420 can be communicatively connected to a wide area network (WAN) 325, such as the Internet. As such, the NAPT devices 415, 420 can be identified by addresses such as "18.24.56.12" and "68.34.12.47".

The system 400 also includes a universal access gateway (FNG) 430. In some examples, the FNG 430 can act as a femtocell access gateway to a core network 435. For example, femtocells can provide 2G or 3G wireless access towards existing clients, and then send the data via a secure tunnel over an internet protocol (IP0 backhaul network to the FNG 430 and into a cellular operator's network. While FNG 430 and service manager (SM) 440 are illustrated as two devices in the example of FIG. 4, the functions provided by these components could be provided by one network component, or many separate network components.

In the illustrated example, the FNG 430 is communicatively connected through the core network to a SM (e.g., a femto service manager) 440 and an application server (e.g., a session initiation protocol (SIP) server) 445. The application server 445 helps to set up and tear down multimedia calls within the network, and also allows entities to register, and to stop and start video sessions. In some examples, the SM 440 can provide network operators with a TR-069 standards-based, scalable management and auto-configuration platform for femtocell deployments. The SM 440 can also provide operators with functions to automate FAP configuration, initiate and manage remote software upgrades, and/or perform remote diagnostics using collected fault and performance data.

Figure 5:
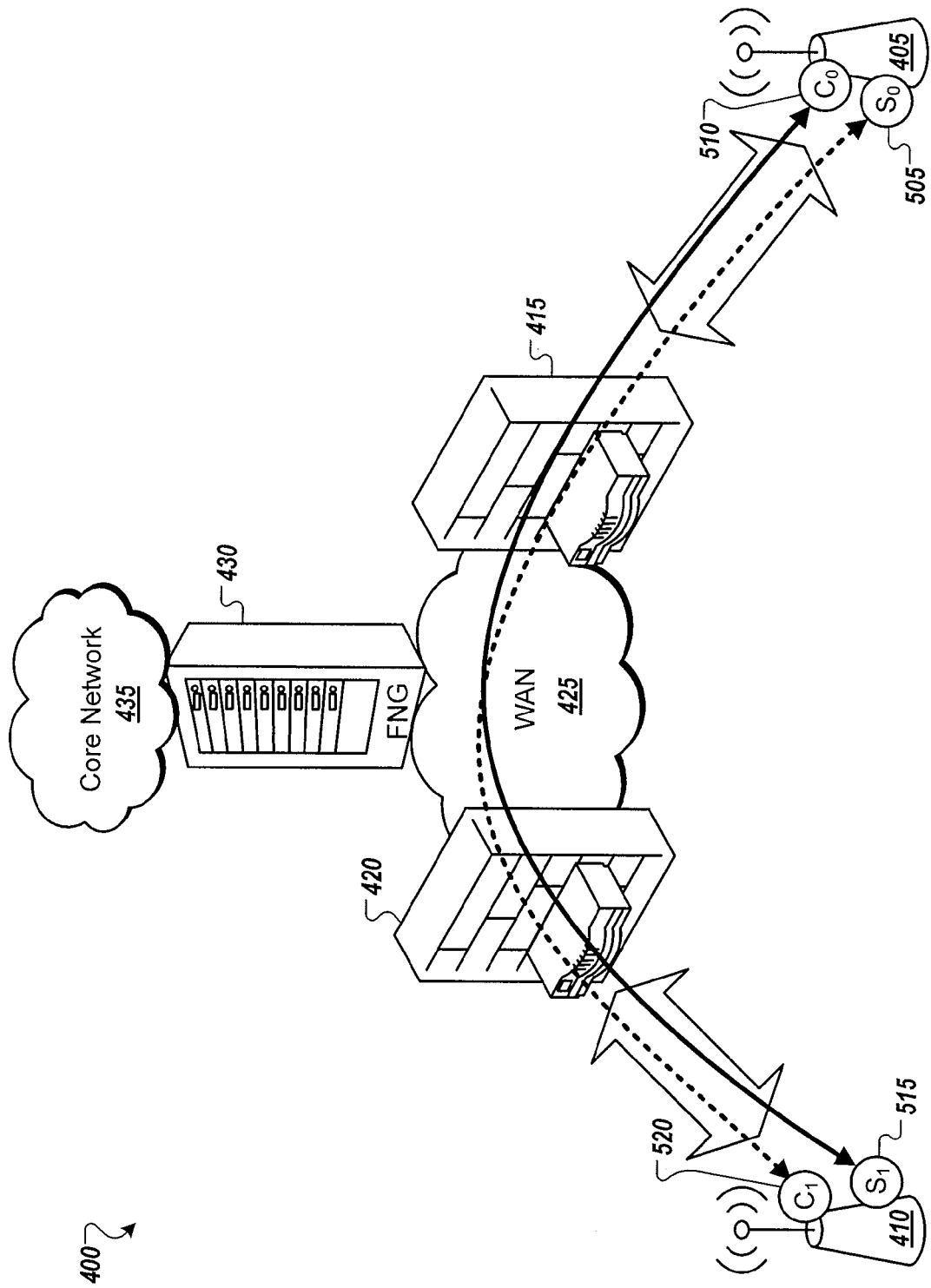
FIG. 5 illustrates an example system of femto access points in peer to peer communication.

FIG. 5 illustrates the example system 400 of FAPs in P2P communication. In general, the FAPs 405, 410 are identified by local IP addresses that may not be unique on the WAN 425. WAN 425 could be, for example, the Internet, private networks, or enterprise networks. The FAPs 405, 410 are connected to local networks behind the NAPTs 415, 420 which may have IP addresses that uniquely identify the NAPTs 415, 420 on the WAN 425. In order to conduct P2P communications, the FAPs 405, 410 may need to determine each others' address. In some examples, the FAPs 405, 410 can directly request the addresses of their respective NAPTs 415, 420, which may be universal plug and play (UPNP) enabled. For example, a UPNP compatible FAP can communicate with a UPNP NAPT to determine the address of the NAPT.

In some examples, the FAPs 405, 410 can determine the addresses of their respective NAPTs 415, 420 by sending a request to a server, such as the FNG 430, or other device. For example, the FAP 405 can send a address request to the FNG 430. The FNG 430 can look at the source IP address of the request to determine the IP address of the NAPT 415, and send that IP address back to the FAP 405 for use as the FAPs 405 address.

The FAP 405 includes a daemon server 505 and a client process 510. Likewise, the FAP 410 includes a daemon server 515 and a client process 520. In some examples, the daemon servers 505, 515 can listen for P2P information requests (e.g., from other FAPs) on a well-known port and can respond to them. Furthermore, the clients 510, 520 can issue requests to the P2P daemon servers 505, 515 on the FAP being queried.

In the illustrated example, the FAP's 405 client 510 makes a P2P information request to the FAP 410 using the address of the NAPT 420. The daemon server 515 of the FAP 410 receives the request, and determines that the request was sent through the NAPT 415. The daemon server 515 can then respond to the request by sending a reply message back to the FAP 405 using the address of the NAPT 415. Similarly, in some examples, the client 520 of the FAP 410 can make a P2P information request to the FAP 405. The daemon server 505 can receive the request and send a response addressed to the address of the NAPT 420.

Communications between the FAPs 405, 410 can be encrypted and/or otherwise secured. For example, the FAPs 405, 410 can use IPsec, HTTPS, or other secure network communication protocols. The FAPs 405, 410 can include an IPsec key exchange (IKE) stack.

P2P applications running on the FAPs 405, 410 can share data using these client/server communication paths as well, and each P2P application can define its own header and message types. Persistent communication paths can be established between the FAPs 405, 410. For example, when heavy data volumes are expected to be exchanged (e.g., transferring video or audio files), one or more persistent TCP streams can be maintained between the FAPs 405, 410.

The FAPs can also share and exchange radio resource information. For instance, the FAPs can exchange information relating to the amount of interference caused by the FAP. Additionally, FAP location information, FAP capabilities, FAP transmit power level, and FAP maximum transmit power level can also be shared and exchanged.

Once the addresses are known to neighboring FAPs ("peers"), the FAPs must engage in the construction of communication tunnels for communicating data which are pertinent to the P2P applications running on the FAPs on the P2P overlay. Each peer "knows" that it is on the overlay, and "knows" the other peers that are currently on the overlay. For this purpose, once the addresses are known, the overlay can be constructed with the explicit engagement of the peers. Because each peer is guaranteed that the other peers are going to be in the overlay, an explicit arrangement for each peer to notify the status of itself in the overlay is needed.

The communication tunnels can be secure or unsecure, can send encrypted, or un-encrypted data, and may or may not engage in peer authentication. For example, an IPSec tunnel using IKE can be setup between the peers. Again, an overlay is constructed between two peers only after an explicit acknowledgement of the other's presence is completed. For this purpose, an insecure tunnel is first established, and then the IPSec tunnel is setup thereafter. Furthermore, the communication tunnels will have to be maintained. This is achieved using information exchanges between the peers (as again, the overlay is maintained as peer pairs).

Figure 6:
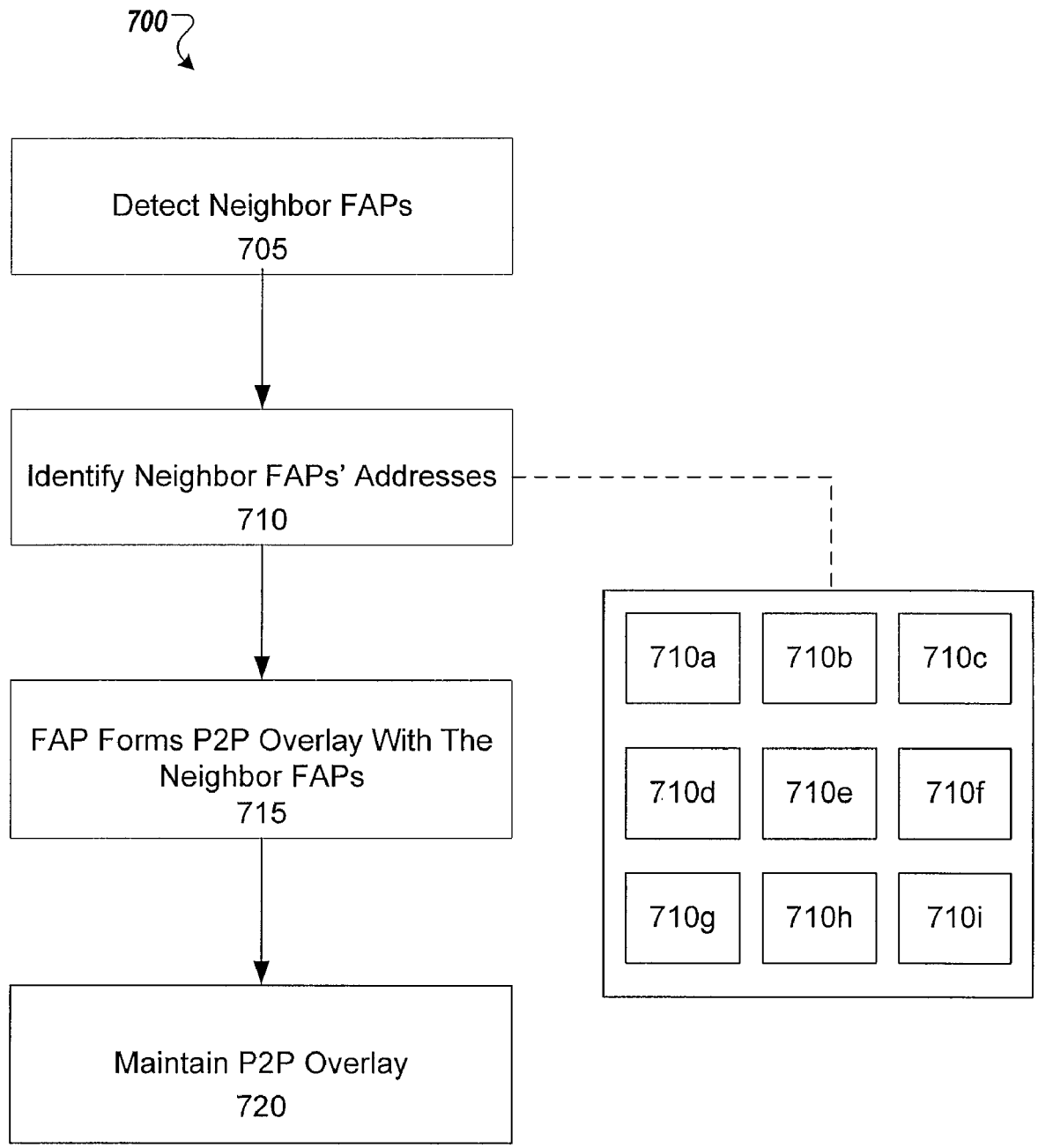
FIG. 6 is a flow diagram of an example process for creating a peer to peer network of femto access points.

FIG. 6 is a flow diagram of an example process 700 for creating a peer to peer network of femto access points. The process 700 includes a step in which a FAP (e.g., one of the FAPs 605-635) detects 705 other neighbor FAPs. In some examples, the FAP can detect 705 other neighbor FAPs by listening for the transmissions of other FAPs. The FAP identifies 710 the addresses of the neighbor FAPs. Nine examples of processes for identifying 710 the addresses of neighbor FAPs are illustrated in FIGS. 7a-7c.

The FAP uses the addresses of neighbor FAPs to form 715 a P2P overlay with the neighbor FAPs. For example, the FAP can add the address to a list of addresses of other FAPs to which the FAP can connect. In some examples, by forming a P2P overlay, a collection of FAPs that are in geographic proximity to each other can be formed. In some examples, the P2P network can be used to share electronic data and/or files among FAPs in a geographic region, such as an apartment building, a dormitory, a barracks, a hotel, a ship, a resort, a school, a campus, or other geographic region where a collection of FAPs can be located substantially nearby each other. In some examples, the FAP maintains 720 the overlay using information exchanges between peers.

Figure 7A:
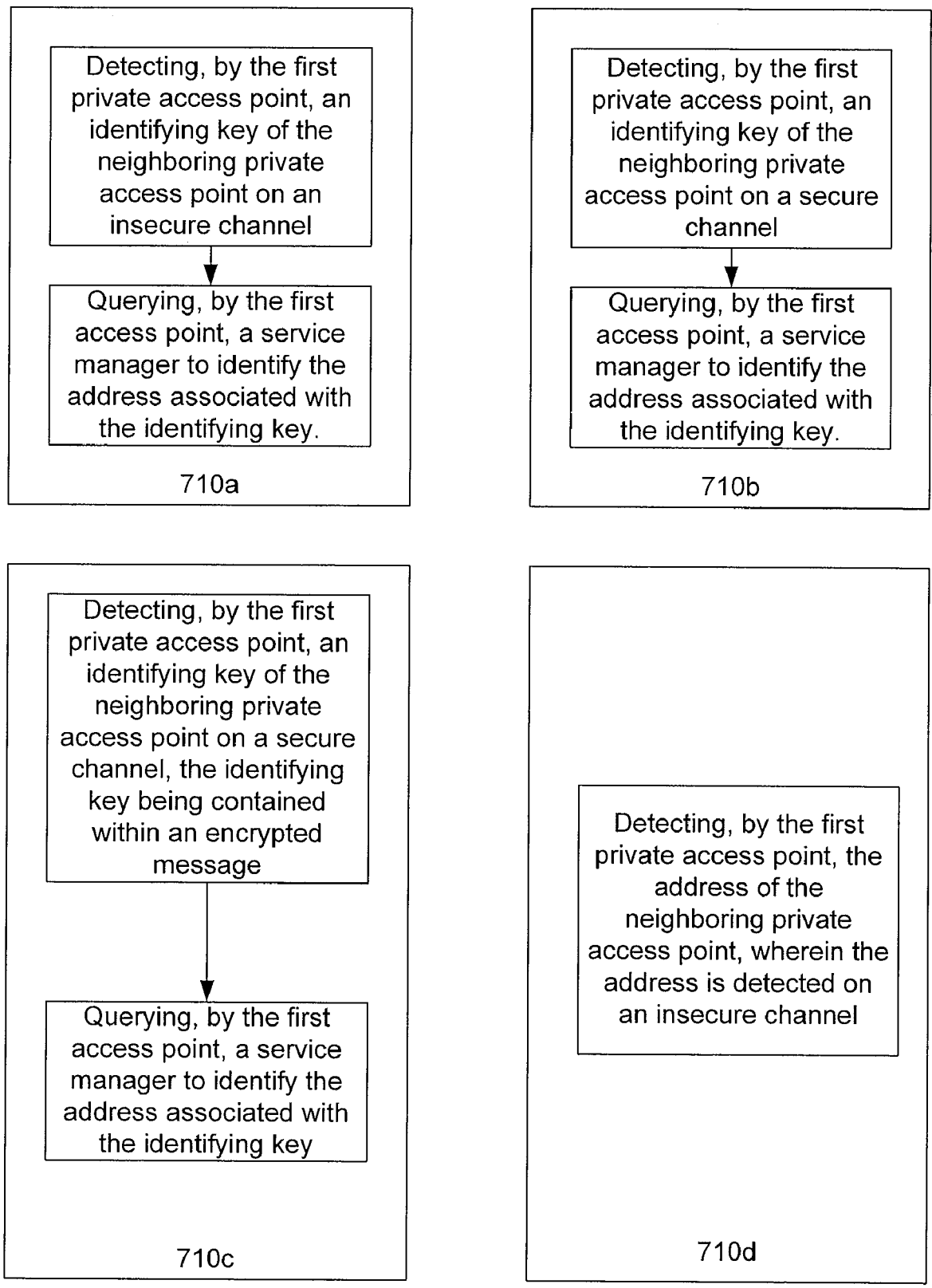

FIGS. 7a-7c are flow diagrams of a exemplary processes for the determination of peer addresses. In essence, an FAP broadcasts some identifying information (e.g., an FAP identifier, such as a local unique identifier, an address, or a set of addresses or FAP identifiers which include the address of the sending FAP and its peers). The information is broadcast with some particular level of security (e.g., the information is sent with no security on a broadcast channel, the information is sent with minimal security on a secure channel, or the information is sent with high security on a secure channel within an encrypted message). In some examples, neighbor FAPs can identify each other by accessing a central coordinating system, such as the SM 440 of FIG. 4, which can be assign, associate, and/or distribute identifiers and addresses.

The FAP detects an identifying key of one of more neighbor FAPs. For example, the FAP can listen for the transmissions of other neighbor FAPs. In some examples, the transmissions can include identifying key data that can be extracted from the received transmissions. The FAP then queries the SM for the address of the neighbor FAP. For example, the FAP can send the SM the identifying key of the neighbor FAP, and the SM can use the identifying key to look up the address of the FAP that is identified by the key and send that address in a response to the query.

In some examples, the FAP can learn the local unique identifier (LUI) of a neighbor FAP using the access point identification message (APIDM) of the neighbor FAP. In some examples, the APIDM can include the LUI of the FAP that sends it. The FAP can then query the SM for the address of the neighbor FAP providing the LUI as the identifying key. The SM can then send the address to the FAP, and the FAP can add the address to a list of FAPs to which the FAP can connect for P2P communications.

In some examples, the SM can add and/or remove FAPs from the P2P network. The SM can update network information of FAPs within the P2P network. For example, the SM can add, remove, and/or update the IP address of one or more FAPs. In some examples, the SM can manage the radius of the P2P network. For example, the SM can limit a P2P network to a predetermined number of FAPs, or limit the P2P network to a particular range of addresses. The SM can manage the update frequency on which FAPs can broadcast and listen for P2P network updates. For example, the SM can configure the FAPs to update their P2P information every hour, 6 hours, 12 hours, 1 day, 2 days, 1 week, or other intervals.

In some examples, FAPs can identify each other by listening for each other's transmissions. For example, a FAP can transmit its address, and nearby FAPs can receive the address and use them to communicate with the transmitting FAP. An SM (e.g., the SM 440 of FIG. 4) can transmit encryption and/or decryption keys and/or time offsets to FAPs (e.g., the FAPs 605-635 of FIG. 6). The FAPs wait to receive the keys and/or time offsets.

One or more of the FAPs listen for messages from one or more neighbor FAPs. In some examples, the listening FAPs can start listening at the time offset transmitted by the SM. One or more neighbor FAPs transmit one or more encrypted messages that include the address(es) of the neighbor FAP(s). In some examples, the neighboring FAPs can encrypt the messages using the encryption key transmitted by the SM. In some examples, the neighboring FAPs can transmit the encrypted messages at the time offset transmitted by the SM.

In some examples, the FAPs can transmit P2P information in specific time offsets in the 1x RTT (CDMA2000) traffic channel (TCH) of the transmitting FAP (e.g., the listening FAP can have the transmitting FAP's pseudorandom noise (PN), and the transmitting FAP can assign a known walsh code to the P2P information transmission). For example, the offset can be sent using a walsh code at a known time offset. In some examples, the known walsh code and time offset value can be sent from the SM to the FAPs in a geographic area. In some examples, the transmissions can contain a host of other information, enclosed as unsolicited messages.

The listening FAP receives and decrypts the encrypted message from the neighboring FAP(s) to determine the neighbor FAPs' addresses. In some examples, the listening FAP can decrypt the encrypted message using the decryption key transmitted by the SM. The listening FAP can return to an access point (AP) mode after the time offset has passed, and can listen for transmissions on a timed interval, such as every 1, 5, 10, 15, or 30 minutes, every hour, every 6 hours, once per day, or on any other interval on which a FAP can be configured to listen for neighboring FAPs.

In some examples, the FAPs (e.g., the FAPs 605-635 of FIG. 6) can determine other FAPs' addresses without transmitting the address. For example, the SM (e.g., the SM 440 of FIG. 4) can transmit time offsets to the FAPs. The FAPs wait for the time offset, at which time(s) the FAPs listen for transmissions from one of more neighbor FAPs. At the time offset, the neighbor FAPs transmit their identifying keys, and the listening FAPs receive the identifying keys.

The listening FAPs send the identifying keys to the SM to request the addresses of the neighboring FAPs. For example, only FAPs that have been authorized to access the LSM can query the LSM to determine the addresses associated with the identifying keys. For example, the security of the P2P overlay can be maintained since addresses are not transmitted over-the-air, nor are they given to unauthorized FAPs.

Figure 8:
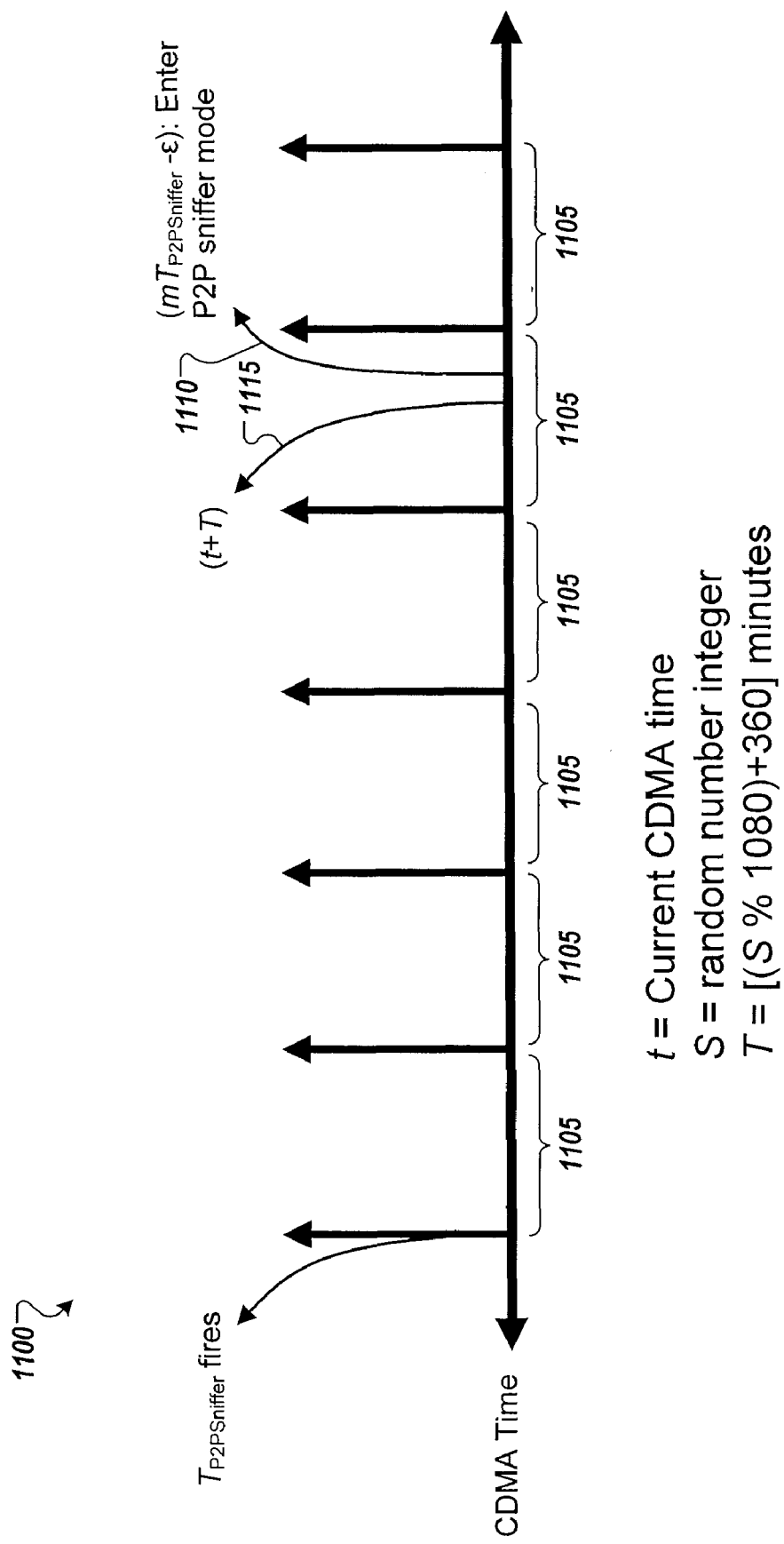
FIG. 8 is a diagram of an example timeline of femto access point peer to peer sniffer mode timing.

FIG. 8 is a diagram of an example timeline 100 of FAP P2P sniffer mode timing in CDMA. In general, FAPs (e.g., the FAPs 605-635 of FIG. 6) can be configured to transmit identifying information on timed intervals. The FAPs can also be configured to listen for the transmissions on individualized intervals in order to receive identifying information from neighboring FAPs. In some examples, the FAPs can enter a "sniffer mode" at startup and on timed intervals to look for neighboring FAPs to add to the P2P network.

In the illustrated example, the value T can be a substantially uniform, random time interval value (e.g., 1 hour, 6 hours, 12 hours, 1 day, 2 days), and the value t can be the current CDMA time. The value S can be a random number integer, and in some examples, can be a value between zero and $(2^{32}-1)$.

The neighboring FAP transmits its identifyng information on a timed interval 1105. In some examples, the information can be transmitted on the 1x traffic channel. In some examples, the listening FAP can awaken in P2P sniffer mode at a time 1110 after a time (t+T) 1115, which can be just before the $T_{P2PSniffer}$ timer fires on the timed interval 1105 for the neighboring FAP. In some examples, the listening FAP can be in P2P sniffer mode for up to 2× $T_{P2PSniffer}$ duration.

Although exemplary embodiments have been described with reference to the figures, other implementations are possible.

Figure 9:
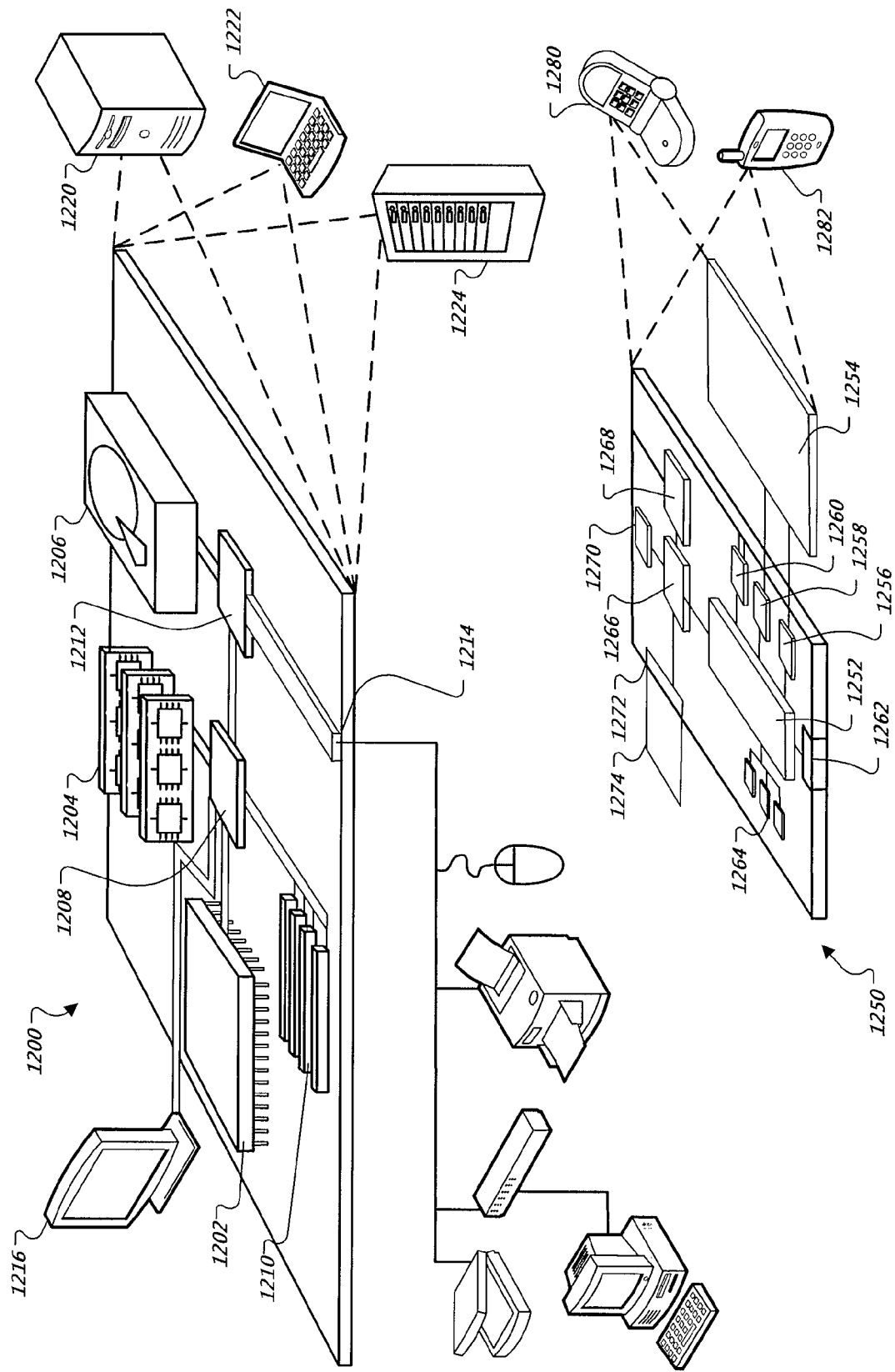
FIG. 9 is a block diagram of computing devices.

FIG. 9 is a block diagram of computing devices 1200, 1250 that may be used to implement the systems and methods described in this document, either as a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or a memory on processor 1202.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 1250, including instructions stored in the memory 1264. The processor may also include separate analog and digital processors. The processor may provide, for example, for coordination of the other components of the device 1250, such as control of user interfaces, applications run by device 1250, and wireless communication by device 1250. Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communication audibly using audio codec 1260, which may receive spoken information from a user and convert it to usable digital information. Audio codex 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming langFNGe, and/or in assembly/machine langFNGe. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method comprising:
   detecting, by a first private access point, a neighboring private access point;
   identifying an address of the neighboring private access point;
   forming, the address, a peer-to-peer network that comprises the first private access point and the neighboring private access points; and
   maintaining the peer-to-peer network between the first private access point and the neighboring private access points;
   wherein identifying the address comprises:
      detecting, by the first private access point, an identifying key of the neighboring private access point on a channel; and
      querying, by the first access point, a service manager to identify the address associated with the identifying key.

2. The method of claim 1, wherein the channel is an insecure channel.

3. The method of claim 1, wherein the channel is a secure channel.

4. The method of claim 1, wherein
   the identifying key is contained within an encrypted message.

5. The method of claim 1, wherein forming the peer-to-peer network comprises creating communication tunnels between the first private access point and the neighboring private access point.

6. The method of claim 1, wherein the peer-to-peer network is maintained by exchanging information between pairs of peer private access points.

7. A computer program product, tangibly embodied in a computer-readable medium, for executing instructions on a processor, the computer program product being operable to cause a machine to:

detect, by a first private access point, a neighboring private access point;
identify an address of the neighboring private access point;
form, using the address, a peer-to-peer network that comprises the first private access point and the neighboring private access points; and
maintain the peer-to-peer network between the first private access point and the neighboring private access points;
wherein identifying the address comprises:
detecting, by the first private access point, an identifying key of the neighboring private access point on a channel; and
querying, by the first access point, a service manager to identify the address associated with the identifying key.

8. The computer program product of claim 7, wherein the channel is an insecure channel.

9. The computer program product of claim 7, wherein the channel is a secure channel.

10. The computer program product of claim 7, wherein the identifying key is contained within an encrypted message.

11. The computer program product of claim 7, wherein forming the peer-to-peer network comprises creating communication tunnels between the first private access point and the neighboring private access point.

12. The computer program product of claim 7, wherein the peer-to-peer network is maintained by exchanging information between pairs of peer private access points.

13. A method comprising:
detecting, by a first private access point, a neighboring private access point;
identifying an address of the neighboring private access point;
forming, using the address, a peer-to-peer network that comprises the first private access point and the neighboring private access points; and
maintaining the peer-to-peer network between the first private access point and the neighboring private access points;
wherein identifying the address comprises:
detecting, by the first private access point on a channel, both the address of the neighboring private access point and a set of addresses known by the neighboring private access point, the set of addresses being associated with peers of the neighboring private access point.

14. The method of claim 13, wherein the channel is a secure channel.

15. The method of claim 13, wherein the channel is an insecure channel.

16. The method of claim 15, wherein an encrypted message contains both the address of the neighboring private access point and the set of addresses.

17. A computer program product, tangibly embodied in a computer-readable medium, for executing instructions on a processor, the computer program product being operable to cause a machine to:
detect, by a first private access point, a neighboring private access point;
identify an address of the neighboring private access point;
form, using the address, a peer-to-peer network that comprises the first private access point and the neighboring private access points; and
maintain the peer-to-peer network between the first private access point and the neighboring private access points;
wherein identifying the address comprises:
detecting, by the first private access point on a channel, both the address of the neighboring private access point and a set of addresses known by the neighboring private access point, the set of addresses being associated with peers of the neighboring private access point.

18. The computer program product of claim 17, wherein the channel is a secure channel.

19. The computer program product of claim 17, wherein the channel is an insecure channel.

20. The computer program product of claim 19, wherein an encrypted message contains both the address of the neighboring private access point and the set of addresses.

* * * * *

UNITED STATES PATENT AND TRADEMARK OFFICE
CERTIFICATE OF CORRECTION

PATENT NO. : 8,280,376 B2  
APPLICATION NO. : 12/347511  
DATED : October 2, 2012  
INVENTOR(S) : Sundaram M. Rajagopalan Page 1 of 1

It is certified that error appears in the above-identified patent and that said Letters Patent is hereby corrected as shown below:

Column 14, Line 37, In Claim 1, after "forming," insert -- using --.

Signed and Sealed this  
Twelfth Day of February, 2013

Teresa Stanek Rea  
*Acting Director of the United States Patent and Trademark Office*